W. G. W. JAEGER.

Condensing and Separating Oils and Gases.

No. 1,902. Reissued March 14, 1865.

Witnesses:
Chas G Page
Wm E Harrison

Inventor:
Wm G W Jaeger

N. PETERS, Photo-Lithographer, Washington, D. C.

UNITED STATES PATENT OFFICE.

WM. G. W. JAEGER, OF BALTIMORE, MARYLAND.

IMPROVEMENT IN CONDENSING AND SEPARATING OILS AND GASES.

Specification forming part of Letters Patent No. 24,561, dated June 28, 1859; Reissue No. 1,902, dated March 14, 1865.

*To all whom it may concern:*

Be it known that I, WILLIAM G. W. JAEGER, of Baltimore, in the county of Baltimore and State of Maryland, have invented a new and useful Improvement in Condensing and Separating Oils and Gases; and I do hereby declare that the following is a full, clear, and exact description thereof, which will enable others skilled in the art to make and use the same, reference being had to the accompanying drawings, forming part of this specification, in which—

Figure 1:
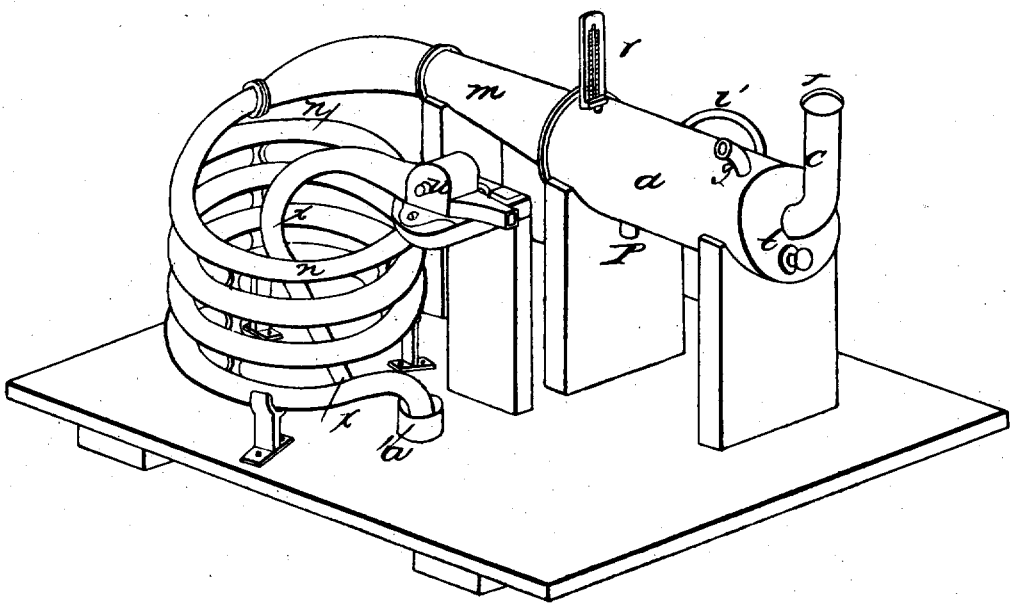
Figure 2:
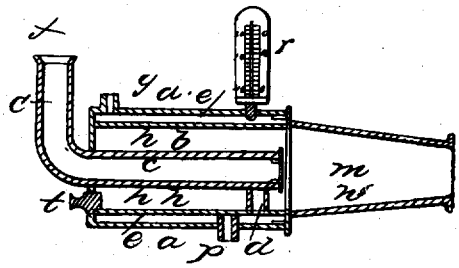

Figure 1 is a perspective view of an apparatus made according to my invention. Fig. 2 is an elevation of a longitudinal vertical section of the condensing-main.

Similar letters of reference indicate like parts.

This invention consists in certain improvements in apparatus for condensing and separating oils and gases in the process of distillation.

The modes in common use for distilling oils are liable to serious difficulties from the frequent choking of the condensing pipes or tubes by the products of the heavy oils. It is, moreover, difficult in working with them to regulate the temperature of the refrigerating medium in the tubs, vats, or boxes containing the condensing-pipes, and to keep it uniform throughout. With the best attention these modes are slow in operation, and are attended with danger and inconvenience from the escape of uncondensed and permanent gases with the oils through the discharging end of the condensing worm or pipe. These are some of the defects of the modes hitherto followed in distilling hydrocarbons.

My invention has for its object to remove them, and to condense the vapors of distillation in a more perfect manner, and to separate the oils in such a way as to prevent the escape of gaseous matter therewith.

In the distillation of hydrocarbons and other liquids, it is desirable to remove from the action of the heat as soon as possible all vapors and gases generated in the retort or still, and to give them an unimpeded passage through the condensing apparatus. If they are checked in their passage through the condenser, they will be forced back toward and into the retort or still, causing an accumulation of vapors therein which can only be driven over by an increase of heat. From this it results that much of the vapor so thrown back and other vapors accumulating in the retort are decomposed and turned into permanent gases by combinations whose formations are, however, not fully understood. It is therefore desirable to construct a condenser which will afford an unimpeded passage to the vapors which come over from the retort or still. It is also desirable to prevent as much as possible the deposition of paraffine or other residuum in the condenser and to remove such depositions when formed. It is also desirable to prevent the escape of uncondensed and permanent gases from the end of the apparatus which have heretofore passed off with the condensed liquid.

To remedy the defects above mentioned, as well as to improve the mode and facilitate the operation of obtaining and separating the oils sought after from the gases, I introduce between the retort or still and the usual condensing-worm a large surface-condenser, which I call the "condensing-main," the construction of which is as follows:

*a b* are two concentric cylinders, properly secured to each other so as to inclose an annular space, *e*. Through the center of the inner cylinder I place another cylinder, *c*, closed at its inner end, which does not pass beyond the ends of the cylinders *a b*, and whose outer end rises to a suitable elevation, *f*, to receive water or other refrigerating matter from any convenient source. The inner pipe, *c*, is connected to the annular space *e* by means of a pipe, *d*, through which the water or other refrigerating medium used passes into said annular space, and it is delivered therefrom through the overflow-pipe *g*, which rises from the upper side of the condensing-main to a suitable height, whence it is to be conducted away by any discharge-pipe. (Not shown.) The flow of the water can be regulated by the usual appliances, and I have not shown any example of any such appliances, because they are common and well known and can be applied by any artisan of ordinary skill. An annular chamber, *h*, is inclosed between the exterior of the pipe *c* and the inner circumference of the cylinder *b*. This chamber is closed at that end of the main which receives the pipe *c*, and is open at that end which is connected to the worm *n*. It has a pipe, P, which passes from its lower side through the annular space *e*, through which the heavy and condensed oils are drawn off, and which may be furnished with a spigot or trap, (not shown,) and it also has a man-hole, *l*, at its end. The chamber *h* communicates with a retort or still by means of a large pipe, *i*, which enters it by passing through the annular space *e*. The place of the pipe is seen in Fig. 1. When there is more than one retort or still discharging into the main, a valve or damper can be placed at or near the end of each discharging-pipe from such retorts or stills, so that when either of the retorts is being charged its dischaging-pipe can be closed against the entrance of vapors from said main. The chamber *h* is connected to the worm *n* by a pipe, *m*, which is so placed that its lower side, *u*, is inclined toward said chamber. A thermometer, *r*, is connected with the annular space *e*, to indicate the temperature of the water or other medium used.

The operation of the condensing-main is as follows: The vapors from the retort or still enter chamber *h*, and the heavier parts and those which condense most readily are there condensed into a liquid and discharged through pipe P, while the vapors which remain uncondensed pass along through the pipe *m* into the condensing-worm *n*. If any of these vapors become condensed in the pipe *m*, the liquid will run down its inclined bottom *u* into the chamber *h*. It will be seen that the action is entirely different from that of the worm or any other condenser ever heretofore used, inasmuch as the vapors both surround and are surrounded by a refrigerating medium. If the bottom of the chamber H becomes clogged by paraffine or other residuum, it can be cleaned out through the man-hole *l*. The sides and other surfaces of the chamber can also be kept free from any deposits of paraffine by shutting off the flow of cold water and allowing the water in the condenser to become heated by the hot vapors passing through the condenser, or by turning in steam through the water-pipe C, and thereby melting the deposits and residuum in the chamber, so that they will run off through the pipe P. The vapors which are not condensed in the chamber *h* and pipe *m* will pass into the condensing-worm *n*, in which they are to be subjected to the condensing action of any suitable refrigerating medium. The liquid derived therefrom will escape from the lower end of the condenser. The gases which are not condensed in the worm or condenser have commonly been suffered to run off with the oil or liquid from the worm or condenser and escape into the air, whereby serious accidents have occurred from their presence in the atmosphere of the apartments where the operations are carried on. Moreover, their odor is very offensive, and their inspiration is injurious to health.

My invention also has for one of its objects the separation of such uncondensed gases from the oil or liquids delivered from the worm or condenser, so that they shall not escape therewith. To this end I immerse the delivery end of the worm or condenser in a trap, *a'*, which has its discharge spout or pipe at a higher elevation than the delivery end of the worm or condenser, so that the oil shall always cover the said delivery end.

I do not confine myself to any peculiar construction of a "trap," my object being to trap the gases at the end of the condenser and separate them from the oils and liquids by an opening and pipe back of the exit of the liquids, through which opening and pipe the gases pass, and which opening and pipe are directly in communication with the retort or still, by which means the vapors generated pass out of the retort or still, through the condenser, free of all obstruction, the uncondensed vapors or gases passing through the opening and pipe X, the condensed liquids passing through the trap *a'*. The trap may be an open or a closed vessel; but in this example I have shown it open to the atmosphere. The trap may be made in any other form which will accomplish the object—as, for instance, of the form of the letter U, which is a cheap and simple shape for trapping air and gas.

*x* is a pipe, which is connected to the worm or condenser near its lower end and at a point above the trap. The pipe *x* may be connected with a fan, *w*, if it is desired to create a suction in the pipe *x*, in order to relieve the condensing apparatus and retort, and the gases thereby withdrawn may be forced into a suitable receptacle to be further utilized, or the end of the pipe *x* may be left open and the gases be burned for either light or heat as they issue therefrom, by which a suction will be created in the pipe *x* and the condensing apparatus and retort will be relieved of pressure independent of a fan or pump; or the pipe *x* may be carried to the open atmosphere or led into any convenient flue. When a fan is connected to the pipe, the action is the same upon the gases in the worm as when the pipe is merely left open or the gases are burned at their exit, only the action is more energetic by reason of the increased suction thereby made, and any other mode of producing suction in the pipe *x* may be used with like effect. The operation of this part of my invention is to relieve the retort and condenser of the presence of the uncondensed gases trapped, and to prevent their escape with the liquid from the end of the condenser in such a way as not to check the free passage of the vapors from the retort or still through the condenser, and to deliver them into any suitable receiver or gasometer to be further utilized, or through any suitable supplementary condensing-medium, or to be burned or disposed of as aforesaid. The communication between the pipe *x* and the retort or still being direct and unbroken, the pressure of the vapor in the retort or still and in the condensing apparatus here shown will be diminished and the passage of the vapor through the apparatus will be facilitated.

I am aware that pumps are used in gas-works to relieve the "main" of the gas which has passed through the water.

I do not claim compelling the uncondensed gases to pass out of the discharge end of the worm and through the trap; but this part of my invention consists in trapping the said gases without checking the flow of vapors from the retort or still, and at the same time in separating the uncondensed gases from the liquids at or near the end of the condenser, as above stated, in such a manner as that they shall not escape with the condensed liquids into the trap.

It will be observed in my condensing-main that the refrigerating medium enters the apparatus centrally, and is then conducted downward into the lower side of the outer chamber, *e*, and is delivered therefrom at the upper side. This construction not only effects the condensation rapidly, but it enables me, by a proper arrangement of stop-cocks, to regulate the flow of the water or other refrigerating medium used, and thereby retard the condensation, or vice versa, as the exigency of the work may demand.

I do not confine myself to any particular point in my condensing apparatus at which I attach the cold-water pipe for the purpose of refrigeration; nor do I confine myself to any particular point at which the vapors and gases may enter the same.

The fan may be connected with other parts of the worm or condenser than the bottom, with similar advantages in respect to relieving the pressure, since the communication between the still and all parts of the condensing apparatus is free.

What I claim as new, and desire to secure by Letters Patent, is as follows:

1. In apparatus for condensing oils and other liquids, in combination, an annular condensing-chamber, through which the vapors of oils and other liquids are to pass as they come from the retort or still, a condensing-surface surrounding such chamber, and a condensing-surface surrounded by such chamber.

2. The combination of a condenser with the conducting-pipe *m*, having an inclined bottom, substantially as described, whether the condenser be arranged within or without a refrigerating-surface, or with both surfaces, in the manner here shown.

3. A trap at the discharge end of the worm or other pipe of a condensing apparatus for trapping the uncondensed gases and preventing their escape from the end of the condenser, substantially as shown and described.

4. Placing a pipe or other opening back of the discharging end of the worm or condenser for delivery of uncondensed gases from the same, substantially as above described.

5. The combination of a pipe or other opening back of the discharging end of the worm with a trap, substantially as above described.

6. A fan or other means for creating a suction, in combination with a pipe, *x*, opening into the worm or condenser, as shown, for taking off the gas therefrom, substantially as described.

7. Interposing a condenser between the retort and condensing-worm to secure the heavy oils before they reach the worm, substantially as described.

8. The use of a fan or equivalent means for relieving the pressure of the vapors in a condensing apparatus and still, and facilitating their movements through such apparatus, substantially as described.

WM. G. W. JAEGER.

Witnesses:
M. M. LIVINGSTON,
C. L. TOPLIFF.